United States Patent
Parker

(10) Patent No.: US 6,846,004 B2
(45) Date of Patent: Jan. 25, 2005

(54) SILICONE-BASED LOW PERMEABILITY AIRBAG FABRIC COATINGS

(75) Inventor: Richard Henry Parker, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/253,358

(22) Filed: Sep. 24, 2002

(65) Prior Publication Data

US 2004/0058601 A1 Mar. 25, 2004

(51) Int. Cl.$^7$ .............................................. B60R 21/16
(52) U.S. Cl. ...................... 280/728.1; 280/740; 106/2; 106/18.12; 428/34.3; 428/34.7; 428/36.1; 428/34.5; 442/71; 442/72; 525/12; 525/24; 525/32; 525/55; 525/106; 525/479
(58) Field of Search ............... 106/2, 18.12; 280/728.1, 280/740; 383/3; 427/287, 389.9, 412; 428/36.1, 34.5, 34.3, 34.7; 442/71, 72; 525/12, 24, 32, 55, 106, 479

(56) References Cited

U.S. PATENT DOCUMENTS

| | | | | |
|---|---|---|---|---|
| 5,208,097 A | * | 5/1993 | Honma et al. ............... 442/164 |
| 5,421,378 A | | 6/1995 | Bowers et al. ............ 139/435.1 |
| 5,503,197 A | | 4/1996 | Bower et al. ............. 139/435.1 |
| 5,658,674 A | * | 8/1997 | Lorenzetti et al. ........... 428/447 |
| 5,700,870 A | * | 12/1997 | Mueller et al. .............. 524/837 |
| 5,753,751 A | * | 5/1998 | Liao et al. .................. 524/837 |
| 5,928,721 A | | 7/1999 | Parker et al. ................ 427/197 |
| 6,037,279 A | * | 3/2000 | Brookman et al. ............ 442/71 |
| 6,200,915 B1 | * | 3/2001 | Adams et al. ............... 442/157 |
| 6,268,300 B1 | * | 7/2001 | Hernandez et al. .......... 442/168 |
| 6,342,280 B1 | * | 1/2002 | Patrick et al. .............. 428/34.6 |
| 6,348,543 B1 | | 2/2002 | Parker ......................... 525/106 |
| 6,354,620 B1 | * | 3/2002 | Budden et al. ........... 280/728.1 |
| 6,468,929 B2 | * | 10/2002 | Parker ......................... 442/164 |
| 6,545,092 B2 | | 4/2003 | Parker ......................... 525/106 |
| 6,562,737 B1 | * | 5/2003 | Bohin et al. ................... 442/59 |
| 2002/0020992 A1 | * | 2/2002 | Kanuma ................... 280/730.2 |
| 2003/0027474 A1 | * | 2/2003 | Hayes ........................ 442/149 |
| 2003/0060103 A1 | * | 3/2003 | Nagaoka et al. .............. 442/59 |

* cited by examiner

Primary Examiner—Artl R. Singh
(74) Attorney, Agent, or Firm—Terry T. Moyer; Charlotte C. Wilson

(57) ABSTRACT

A new adhesive coating composition, particularly for use on airbag fabrics, which is composed of a silicone polymer and an appreciable level of a copolymer of ethylene and a polar monomer, is provided. This coating provides excellent adhesive properties to the coated fabric and provides a synergistic effect such that lower gas permeability upon inflation may be obtained with this coating than might be achieved with the silicone polymer alone. Additionally, such a coating allows maximization of the adhesion characteristics on one-piece woven airbag fabric such that blistering upon high-pressure inflation can be reduced, while retaining a high degree of inflation gas retention. Fabric treated with this material in the manner described herein permits reduction in the cost of the coating itself (by reducing the use of expensive silicone polymers). Airbag fabrics and cushions, as well as methods of making and using such a novel airbag coating material are also encompassed within this invention.

8 Claims, No Drawings

SILICONE-BASED LOW PERMEABILITY AIRBAG FABRIC COATINGS

FIELD OF THE INVENTION

This invention relates to a new adhesive coating composition, particularly for use on airbag fabrics, which is composed of a silicone polymer and an appreciable level of a copolymer of ethylene and a polar monomer. This coating provides excellent adhesive properties to the coated fabric and provides a synergistic effect such that lower gas permeability upon inflation may be obtained with this coating than might be achieved with the silicone polymer alone. Additionally, such a coating allows maximization of the adhesion characteristics on one-piece woven airbag fabric such that blistering upon high-pressure inflation can be reduced, while retaining a high degree of inflation gas retention. Fabric treated with this material in the manner described herein permits reduction in the cost of the coating itself (by reducing the use of expensive silicone polymers). Airbag fabrics and cushions, as well as methods of making and using such a novel airbag coating material are also encompassed within this invention.

BACKGROUND OF THE PRIOR ART

Airbags for motor vehicles are known and have been used for a substantial period of time. These devices are installed on the driver and passenger side of automobiles and, in the event of a collision, are rapidly inflated with gas, to act as a barrier between the driver or passenger and the steering wheel or dashboard of the automobile.

Coatings have been applied to fabrics, intended for use in automotive airbags, to resist the unwanted permeation of air through the fabric and, to a lesser extent, to protect the fabric from detriment by the hot gases used to inflate the bags. Polychloroprene was the polymer of choice in the early development of this product, but the desire to decrease the folded size of the completed airbag, and the tendency of polychloroprene to degrade, with exposure to heat, and release the components of hydrochloric acid (thereby potentially degrading the fabric component as well as releasing hazardous chemicals), has led to the almost universal acceptance of silicone (polydimethylsiloxane or similar materials) as a more suitable coating. In the quest for the most compact folded size possible, coating levels of polymer have dropped from around 2.5 ounces per square yard of fabric, to levels approaching 0.5 ounces per square yard (for driver's side and passenger airbags that do not generally require long-term gas retention).

There are three primary types of different airbags, each for different end uses. Driver side airbags are generally mounted within steering columns and exhibit relatively low air retention in order to act more as a cushion for the driver upon impact. Passenger-side airbags also comprise relatively high air permeability fabrics that permit release of gas either by percolation of the gas through the fabric or through vents integrated therein. Both of these types of airbags (composed of multiple fabric panels) are designed to protect persons in sudden collisions and generally burst out of packing modules from either a steering column or dashboard. Side curtain airbags, however, have been designed primarily to protect passengers during rollover crashes by retaining the inflation state for a long duration and generally unroll from packing containers stored within the roofline along the side windows of an automobile. Side curtain airbags therefore not only provide cushioning effects but also provide protection from broken glass and other debris. Therefore, it is imperative that side curtain airbags, as noted above, retain large amounts of gas, as well as high gas pressures, to remain inflated throughout the longer time periods of the entire potential rollover situation. To accomplish this, these side curtains are generally coated with very large amounts of sealing materials on both the front and back faces. Since most side curtain airbag fabrics are comprised of woven blanks that are either sewn, or sealed, or integrally woven together, discrete areas of potentially high leakage of gas are prevalent, particularly at and around the seams. It has been accepted as a requirement that heavy coatings were necessary to provide the low permeability (and thus high leak-down time) necessary for side curtain airbags. Without such heavy coatings, such airbags would most likely deflate too quickly and thus would not function properly during a rollover collision. As will be well understood by one of ordinary skill in this art, such heavy coatings add great cost to the overall manufacture of the target side curtain airbags. There is thus a great need to manufacture low permeability side curtain airbags with less expensive (preferably lower coating add-on weight) coatings without losing the aging, humidity, and permeability characteristics necessary for proper functioning upon deployment. To date, there has been little accomplished, if anything at all, that alleviates the need for such thick and heavy air retentive coatings from side curtain airbags.

New developments in airbags, particularly newer designs being placed in the sides of the passenger compartment (i.e., side curtain airbags), have introduced the requirement that the bags hold pressure longer under use (for the purpose of protection during a potential rollover collision) than for driver's side and passenger airbags. Such rollover protection side curtain airbags (note: some side curtains are not designed for rollover protection and usually exhibit the same levels of gas permeability as the other standard types of airbags) generally require thicker coatings of the most trustworthy materials (e.g. silicone polymers).

Silicone polymers have excellent thermal properties but have relatively high permeability to gases, when compared to many other elastomers. This has not been a matter of concern in coatings used for driver side airbags, since the retention time requirements are very small, as noted above. The advent of side curtains, with higher air retention requirements is bringing to light the difficulties in achieving the desired retention properties at desired add-on levels.

The utilization of such silicone polymers has, in the past, come at a price. The costs associated with such silicone compounds are generally quite high, particularly the costs required to provide sufficient coverage of target fabrics while best ensuring low permeability will continue as long as necessary. Furthermore, although lower levels of other types of coatings (thermoplastics and thermosets, such as polyurethanes, for example) have been utilized for such a purpose, there are general add-on amounts that, to date, are required to provide needed long-term inflation gas retention rates for target silicone-coated airbag cushions. As stated above, silicone coating materials are generally preferred over other polymer types due to their ability to withstand varied environmental and storage conditions over long duration. Thus, it is highly desired to utilize a trustworthy, high inflation gas retention, coating for low permeability airbag cushions, particularly with relatively low costs involved in providing such benefits.

Furthermore, yarn shifting has proven to be a significant problem for such airbag cushions as well. When a sewn seam is put under stress, a naturally lubricating silicone coating may allow the yarns from which the fabric is constructed to shift. This shifting can lead to leakage of the inflating gas through the new pores formed from the shifting yarns, or, in drastic cases, cause the seam to fail. Since the airbag must retain its integrity during a collision event, in order to sufficiently protect the driver or passenger, there is a great need to provide coatings which provide both effective permeability characteristics and sufficient restriction of yarn shifting for the airbag to function properly, if and when necessary. Again, such a coating material is preferably silicone in nature for storage purposes. Therefore, a need exists to provide such beneficial characteristics at lower cost and/or lower add-on levels through an airbag coating that provides low permeability, resistance to yarn shifting and age resistance over long periods of storage.

As another issue, it has recently been found that more efficient side curtain airbag cushions may be produced as one-piece woven (preferably Jacquard woven) articles. Interestingly, the requirements for effective coatings for such one-piece woven airbags are significantly different from those needed for standard driver or passenger side airbags. A one-piece Jacquard (for example) airbag cushion is more economical to produce due to the elimination of the need to first cut fabric portions from coated webs and subsequently sew them together. The distinct disadvantage of this system is that the target bag must be coated on the outside during production, (as opposed to a sewn bag in which the coated face is normally placed within the interior of the air bag). When the Jacquard woven bag is then deployed, inflation pressures may be transmitted through the fabric to the coating, applying a potentially delaminating force to that coating and creating a potential problem. If the adhesion of the coating to the fabric is strong, then the diffusion forces are localized and, depending upon the strength of the coating film, may lead to a rupture of the film itself, whereupon the inflation gases can easily escape. If the airbag is intended as a side curtain, such inflation gas loss would severely reduce the effectiveness of the inflated airbag and jeopardize its ability to protect during a long duration rollover scenario. On the other hand, if the adhesion of the coating is less strong, then the diffusing force can be dissipated by localized delamination of the film without rupture thereof. This would typically result in a blister (known in the airbag coating industry as an aneurysm) wherein the inflating gases can be retained, but the appearance of the bag is objectionable, regardless of the fact that the bag itself most likely retains the inflation gases therein. Thus, coatings for such one-piece woven airbags must take into account this dichotomy and balance the adhesion of the coating with the retention of the inflating gases. To date, such a balance of considerations in developing proper airbag coatings, particularly for one-piece woven airbag cushions, has not been exercised.

Furthermore, there is a current drive to store such low permeability side curtain airbags within cylindrically shaped modules. Since these airbags are generally stored within the rooflines of automobiles, and the area available is quite limited, there is always a great need to restrict the packing volume of such restraint cushions to their absolute minimum. However, the previously practiced low permeability side curtain airbags have proven to be very cumbersome to store in such cylindrically shaped containers at the target automobile's roofline. The actual time and energy required to roll such heavily coated low permeability articles as well as the packing volume itself, has been very difficult to reduce. Furthermore, with such heavy coatings utilized, the problems of blocking (i.e., adhering together of the different coated portions of the cushion) are amplified when such articles are so closely packed together. The chances of delayed unrolling during inflation are raised when the potential for blocking is present. Thus, a very closely packed, low packing volume, low blocking side curtain low permeability airbag is highly desirable. Unfortunately, the prior art has again not accorded such an advancement to the airbag industry.

OBJECTS OF THE INVENTION

It is therefore an object of the invention to provide an adhesive coating composition for fabric substrates, which provides excellent low permeability and resistance to leakage upon inflation. Maximization of this property also allows for optimization of the above-mentioned dichotomy, improving the potential for manipulation of the adhesion of the coating without falling below a minimum acceptable air retention level. It is a further object of the invention, to provide a highly cost-effective, easily handled and simple-to-make formulation for use as an adhesive coating on fabric surfaces. Yet another object of the invention is to provide a highly effective coating for airbag fabrics, bags and cushions, particularly one-piece woven side curtains, which substantially reduces the chances of excessive leakage.

DESCRIPTION OF THE INVENTION

The inventive coating (which may be utilized on any fabric substrate) provides such an improvement. Such a coating is thus, broadly stated, comprised of a "two part" silicone polymer blended with a curing catalyst and a copolymer of ethylene and at least one type of polar monomer. Also, such an inventive coating may be defined as a blend of a commercial two part silicone polymer with a copolymer of ethylene and a polar monomer, which, when present in an amount of at most 3 ounces per square yard over the entirety of a Jacquard woven one-piece side curtain airbag, provides sufficient low air permeability for said airbag that said airbag cushion exhibits a characteristic leak-down time after long-term storage (as discussed below, the time required for the internal pressure within said cushion to reduce from 20 psi to 10 psi) of at least 20 seconds (preferably, at least 25 seconds, more preferably at least 40 seconds, and most preferably, at least 55 seconds) of inflation. It should be noted, however, that such characteristics are not universally required of each and every treated airbag fabric or cushion to which such a specific coating has been applied. Some variations in permeability results may exist depending on the types of airbags ultimately produced and utilized therewith. Such specifically defined coatings have heretofore not been available to the airbag coating industry.

More specifically, the inventive material is comprised of a silicone polymer, such as, without limitations, (e.g. a polyalkyl- or a polyphenylsiloxane), blended with a copolymer of ethylene and at least one polar monomer, such as, as non-limiting preferred substituents, methyl acrylate, vinyl acetate, and the like. To make an effective coating the silicone polymer must be crosslinked, utilizing a catalyst. The catalyst may be any standard type, such as those based on platinum compounds, those based on peroxides (e.g. cumyl peroxide), materials, known in the trade as "condensation catalysts", and the like. Preferred for best results is the platinum-based catalyst. Such a cured silicone polymer (which still retains some catalyst material therein) is then blended with the ethylene/polar monomer copolymer constituent. Such a copolymer may be present in liquid form completely, or in any mix of solids and liquid; however, it is highly preferred that the copolymer first be, dissolved in an organic, highly volatile (low flash point) solvent (such as, without limitation, toluene, MEK, and the like, with toluene most preferred), to then leave a partially dissolved copolymer formulation for ease in handling and ease in incorporation with the silicone polymer. Preferably, the level of solids of the ethylene/polar monomer copolymer is from 1–40%, more preferably from 10–35%, and most preferably between about 15–25%. The volatile solvent can then be evaporated from the blend of silicone polymer and ethylene/polar monomer copolymer, and, upon subsequent exposure to sufficient heat, the entire formulation can then be crosslinked (cured) to form a uniform coating on a target airbag fabric or airbag cushion surface. The ethylene/polar monomer copolymer can be added in significant amounts to reduce the amount of silicone copolymer required to produce a successful airbag coating. At replacement levels up to 25% by weight of the total airbag coating composition, the added ethylene/polar monomer component provides a level of low air permeability and adhesion that cannot be achieved by the cured silicone system alone. Such a system thus provides a very low permeability level when applied to airbag cushions and fabrics utilizing less silicone, thereby reducing the cost of the coating.

It has been found that ethylene-methyl acrylate copolymers (such as VAMAC® 2036-1, available from DuPont) and/or ethylene-vinyl acetate copolymers (such as LEVAMELT® 500, available from Bayer) provide the most desired qualities upon incorporation with the silicone copolymer, while retaining the other required properties for an airbag fabric. Preferably, the coating is produced by combining, in solution, 50–95 parts of a silicone polymer (preferably containing a platinum catalyst) and 5–50 parts of the ethylene/polar monomer copolymer. The silicone polymers for this inventive coating composition may be selected from any number of types of such polymers, including, without limitation, polyalkylsiloxanes, polyarylsiloxanes, copolymers of both, and the like, each including crosslinkable functionalities. Specifically, the preferred polyalkylsiloxane is a polydimethylsiloxane and the preferred polyarylsiloxane is a polyphenylsiloxane, either of these materials may contain nondisclosed materials common to the compounding of commercial materials of this sort. The ethylene/polar monomer-containing copolymer may be a copolymer comprised of 60–85 weight percent ethylene and 15–40 weight percent methyl acrylate, preferably from 65–75 weight percent ethylene and 25–35 weight percent methyl acrylate, and most preferably a distribution of about 66–67 to about 33–34 of the two components. It may also be an ethylene containing copolymer comprised of 20–60 weight percent ethylene and 40–80 weight percent vinyl acetate, preferably from about 25–50 weight percent ethylene and from about 50–75 weight percent vinyl acetate, and most preferably about 40 and about 60 weight percent of these two components. The preferred curing agent is platinum catalyst, although other types, including inorganic types, such as palladium, etc., organic types, such as acyl peroxide, typically, but not limited to, benzoyl peroxide, may also be utilized for this purpose. Other well known curing agents may also used be used either supplemental to or as a substitute for the preferred platinum type. Also, a solvent is preferably present to effectuate proper and thorough mixing of the components of the preferred coating composition, as well as the provision of a certain level of solids of the ethylene/polar monomer copolymer. More preferably such solvent is organic and volatile (i.e., evaporates easily at a relatively low temperature); most preferably such a solvent is toluene or similar type volatile liquid. Preferably, the ethylene/polar copolymer compound is first dissolved in such a solvent to provide a relatively low solids level between about 1 to 40%, preferably from 10 to 30%, and most preferably from 20 to 25%. Also, the copolymer is preferably added to the silicone polymer formulation in an amount of from about 10–35 parts of the total silicone copolymer present therein, more preferably from about 12–30 parts, and most preferably about 15–25 parts, depending on the copolymer chosen.

The coating may also contain certain silane coupling agents to improve the adhesion of silicone containing coatings to fabrics (such as trimethoxysilanes, triethoxysilanes, mixtures thereof, and the like). Of particular interest are small amounts (e.g., from about 0.5–2, preferably about 1 part per hundred) of γ-isocyanatopropyltrimethoxysilane, and/or 3-methacryloxypropyltrimethoxysilane, with a mixture of 1 phr of each component preferred. Such an additive has been found to significantly increase adhesion for the inventive coatings on target one-piece woven airbag cushions to prevent the aforementioned unsightly blistering (aneurysms) that may occur in certain cushions upon inflation.

It may also contain pigments or colorants, (for identification or aesthetic reasons); inert ingredients (such as calcium carbonate or other materials classified as fillers), to reduce cost without also reducing the desired performance of the inventive coating as applied to the target fabric; flame retardants; and processing aids necessary to process the composition and make it suitable for use as an airbag coating.

This inventive coating composition may be applied to any type of fabric substrate to provide effective low air permeability, as well as to alleviate seam tears and unraveling at cut edges. Thus any type of fabric may be utilized in conjunction with the inventive coating, including those comprising natural fibers, such as cotton, ramie, abaca, wool and the like; synthetic fibers, such as polyester, polyamide, regenerated cellulose and the like; and inorganic fibers, such as glass, boron derivative fibers and the like. Furthermore, the target fabrics may be woven, knitted, non-woven and the like. Preferably, the target fabric substrate comprises synthetic fibers, preferably, polyesters and polyamides and is preferably an airbag fabric. Most preferably, the airbag fabric is actually a Jacquard woven one-piece side curtain airbag cushion.

If an airbag fabric is desired, any standard low permeability airbag fabric construction may be utilized as the target airbag fabric with the inventive composition. Preferably, however, as noted above, the target airbag within this invention is a Jacquard woven cushion, formed from yarns comprising polyamide or polyester fibers. Such yarn preferably has a linear density of about 210 denier to about 630 denier. Such yarns are preferably formed from multiple filaments, wherein the filaments have linear densities of about 6 denier per filament or less and most preferably about 4 denier per filament or less. Such substrate fabrics are preferably woven using fluid jet weaving machines as disclosed in U.S. Pat. Nos. 5,503,197 and 5,421,378 to Bower et al. (incorporated herein by reference). The fabric substrate with applied coating will hereinafter be referred to as an airbag base fabric.

In one potentially preferred embodiment for the invention, upon completion of compounding of the inventive coating, the formulation is preferably scrape coated across the airbag base fabric, the solvent (toluene, for example) is subsequently removed by evaporation by placing the treated airbag base fabric in an oven at 60–90° C., and the resultant coated airbag base fabric is then cured in an oven at 150–200° C. to cross-link the remaining copolymer constituents and to ultimately form a thin coating. Scrape coating, in this sense includes, and is not limited to, knife coating, in particular, knife over roll, knife over gap, knife over table, floating knife and knife over foam pad methods, to name a few method types. Since the coating composition exhibits excellent adhesive properties, generally only one coating pass is necessary to provide an effective, stable, low permeability coating on the target fabric surface.

The final dry weight of the coating may vary with the intended use. For fabrics in which prolonged retention of the inflating air is not as critical (such as certain non-rollover side curtains, driver's side and passenger airbag cushions), the add-on may be (preferentially) one ounce per square yard. For fabrics in which the extended retention of the inflating air is required, especially in the case of Jacquard woven air bags intended for side curtain use, the add-on (preferred) would be 2–3 ounces per square yard, depending on the design of the bag. The resultant base fabric is also substantially impermeable to air, when measured according to ASTM Test D737, "Air Permeability of Textile Fabrics".

As previously indicated, the substrate fabric is preferably a woven nylon material. In the most preferred embodiment, such substrate fabric will be formed from fibers of nylon 6,6. It has been found that such polyamide materials exhibit particularly good adhesion when used in combination with the coating according to the present invention.

The term "characteristic leak-down time" as it pertains to this invention is intended to encompass the measurement of time required for the internal pressure of the target airbag cushion to decrease from an initial pressure of 20 psi to 10 psi. It is well known and well understood within the airbag art, particularly concerning side curtain (low permeability) airbag cushions, that retention of inflation gas for long periods of time is of utmost importance during a collision. Side curtain airbags are designed to inflate as quickly as driver- and passenger-side bags, but they must deflate very slowly to protect the occupants during roll over and side impact. Thus, it is imperative that the bag exhibits a very low leakage rate after the bag experiences peak pressure during the instantaneous, quick inflation. Hence, the coating on the bag must be strong enough to withstand the shock and stresses when the bag is inflated so quickly. Thus, a high characteristic leak-down time measurement is paramount in order to retain the maximum amount of beneficial cushioning gas within the inflated airbag. Thus, the ability for a target airbag cushion to retain such a high internal pressure for a minimum of 25 seconds, preferably 30 seconds, more preferably 45 seconds, and most preferably at least 55 seconds, is imperative to provide the maximum protection in the event of a rollover collision. Such a high leak-down time has heretofore been unavailable without utilizing very expensive high add-on levels of silicone coatings.

It is well understood that the pressure of gas forced into the airbag after peak initial pressure is reached will not remain stable (it decreases during the subsequent introduction of inflation gas), and that the target airbag will inevitably permit escape of a certain amount of inflation gas during that time. The primary focus of such side curtain airbags (as noted above) is to remain inflated for as long as possible in order to provide sufficient cushioning protection to vehicle occupants during rollover accidents. The greater amount of gas retained, the better cushioning effects are provided the passengers. Thus, the longer the airbag retains a large amount of inflation gas, and consequently the greater the characteristic leak-down time, the better cushioning results are achieved. At the very least, the inventive airbag must retain at least half of its inflated gas volume 5 seconds subsequent to reaching peak initial pressure. Preferably, this time is 9 seconds, more preferably 15 seconds, and most preferably 20 seconds.

Likewise, the term, "after long-term storage" encompasses either the actual storage of an inventive airbag cushion within an inflator assembly (module) within an automobile, and/or in a storage facility awaiting installation. Such a measurement is generally accepted, and is well understood and appreciated by the ordinarily skilled artisan, to be made through comparable analysis after representative heat and humidity aging tests. These tests generally involve 107° C. oven aging for 16 days, followed by 83° C. and 95% relative humidity aging for 16 days and are universally accepted as proper estimations of the conditions of long-term storage for airbag cushions. Thus, this term encompasses such measurement tests. The inventive airbag fabrics must exhibit proper characteristic leak-down times after undergoing such rigorous pseudo-storage testing.

PREFERRED EMBODIMENTS OF THE INVENTION

In order to further describe the present invention, the following nonlimiting examples are set forth. The examples are provided for the sole purpose of illustrating preferred embodiments of the invention and are not to be construed as limiting the scope of the invention in any manner. Coating dispersions were prepared as noted below, using the following constituents, wherein all proportions are by parts:

EXAMPLE 1

Fifteen parts of VAMAC® 2036-1 (copolymer from DuPont Polymers) was dissolved in toluene to make a 25 percent solution. This material was then added to 85 parts of a two-part silicone polymer, Shin-Etsu Chemical Co., Ltd, KE-2001-50 A/B, with 1.0 phr of γ-isocyanatopropyltrimethoxysilane (available from Shin-Etsu Chemical Co. Ltd., under the tradename KBE9007) and the resulting mixture was diluted to 50 percent solids with toluene.

EXAMPLE 2

A coating composition was made in the manner of Example 1 in which the copolymer was VAMAC 2036-1 and the silicone polymer was RHODORSIL® LSR60HS (available from Rhodia) and diluted to form a resulting mixture of 50 percent solids.

EXAMPLE 3

A coating composition was made in the manner of Example 1 in which the copolymer was VAMAC 2036-1 and the silicone polymer was 3730 Fabric Coating (available from Dow Corning) and diluted to form a resulting mixture of 50 percent solids (with toluene).

EXAMPLE 4

A coating composition was made in the manner of Example 1 in which the copolymer was VAMAC 2036-1 and the silicone polymer was Shin-Etsu Chemical Co., Ltd., X-34-1277 A/B and diluted to form a resulting mixture of 50 percent solids (with toluene).

EXAMPLE 5

A coating composition was made in the manner of Example 1 in which the copolymer was VAMAC 2036-1 and the silicone polymer was Shin-Etsu Chemical Co., Ltd., A2-37 A/B and diluted to form a resulting mixture of 50 percent solids (with toluene).

EXAMPLE 6

A coating composition was made in the manner of Example 1 with the VAMAC 2036-1 replaced with LEVAMELT® 500 (available from Bayer).

Comparatively, each of the two-part silicone polymers from EXAMPLEs 1–5, above, was utilized without the added ethylene-polar compound copolymer. These materials were then individually coated onto separate 420 denier, nylon 6,6 Jacquard woven one-piece airbag cushions of dimensions 800×250 mm, using a knife coater, dried for two minutes at 150° C., and cured for seven minutes at 170° C. The dry coating weight was 2 ounces per square yard. The characteristic leak-down time from an internal inflation pressure of 20 psi to 10 psi was then measured in accordance with the procedure delineated above. The measurements are tabulated below:

EXPERIMENTAL TABLE

| | Time for internal pressure to fall from 20 to 10 psi (seconds) | |
|---|---|---|
| Example | Silicone Polymer Alone | With Copolymer |
| 1 | 5 | 29 |
| 2 | 17 | 81 |
| 3 | 12 | 68 |
| 4 | 8 | 93 |
| 5 | 36 | 68 |
| 6 | 5 (same as 1) | 60 |

There are, of course, many alternative embodiments and modifications of the present invention which are intended to be included within the spirit and scope of the following claims.

What is claimed is:

1. A uniform airbag coating formulation comprising a blend of (i) at least one silicone polymer, (ii) a copolymer of ethylene and at least one type of polar monomer, and (iii) at least one volatile solvent, wherein said formulation is optionally blended with a curing catalyst.

2. An airbag fabric having at least one surface, wherein at least a portion of said surface is coated with the coating formulation of claim 1.

3. An airbag cushion comprising the fabric of claim 2.

4. A one-piece Jacquard woven cushion comprising a fabric having at least one surface, wherein at least a portion of said surface is coated with a uniform airbag coating formulation, said coating formulation comprising a blend of (I) at least one silicone polymer, (ii) a copolymer of ethylene and at least one type of polar monomer, and (iii) at least one volatile solvent, wherein said coating formulation is optionally blended with a curing catalyst.

5. A uniform airbag cushion formulation comprising a blend of (i) at least one silicone polymer and (ii) a copolymer of ethylene and at least one type of polar monomer, which, when present in an amount of at most 3 ounces per square yard, over the entirety of a Jacquard woven one-piece side curtain airbag, said airbag coating formulation provides sufficient low air permeability for said airbag that said airbag cushion exhibits a characteristic leak-down time in excess of that exhibited by the silicone polymer alone.

6. An airbag fabric having at least one surface, wherein at least a portion of said surface is coated with the coating formulation of claim 5.

7. An airbag cushion comprising the fabric of claim 6.

8. A one-piece Jacquard woven airbag cushion comprising a fabric having at least one surface, wherein at least a portion of said surface is coated with a uniform airbag coating formulation, said coating formulation comprising a blend of (i) at least one silicone polymer and (ii) a copolymer of ethylene and at least one type of polar monomer, which, when present in an amount of at most 3 ounces per square yard, over the entirety of said Jacquard woven airbag cushion, said coating formulation provides sufficient low air permeability for said airbag cushion that said Jacquard woven airbag cushion exhibits a characteristic leak-down time in excess of that exhibited by the silicone polymer alone.

* * * * *

UNITED STATES PATENT AND TRADEMARK OFFICE
CERTIFICATE OF CORRECTION

PATENT NO. : 6,846,004 B2  
APPLICATION NO. : 10/253358  
DATED : January 25, 2005  
INVENTOR(S) : Richard Henry Parker Page 1 of 1

It is certified that error appears in the above-identified patent and that said Letters Patent is hereby corrected as shown below:

Col. 10 line 17

Claim 5, Line 1 - the word "cushion" should be replaced with the word --coating--

Signed and Sealed this

Eighteenth Day of March, 2008

JON W. DUDAS  
*Director of the United States Patent and Trademark Office*